(12) United States Patent
Mizusaki et al.

(10) Patent No.: US 8,647,724 B2
(45) Date of Patent: Feb. 11, 2014

(54) LIQUID CRYSTAL DISPLAY DEVICE, PROCESS FOR PRODUCING LIQUID CRYSTAL DISPLAY DEVICE, COMPOSITION FOR FORMING POLYMER LAYER, AND COMPOSITION FOR FORMING LIQUID CRYSTAL LAYER

(75) Inventors: Masanobu Mizusaki, Osaka (JP); Takashi Katayama, Osaka (JP); Yuichi Kawahira, Osaka (JP); Takeshi Noma, Osaka (JP); Yohei Nakanishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 133 days.

(21) Appl. No.: 13/257,797

(22) PCT Filed: Oct. 8, 2009

(86) PCT No.: PCT/JP2009/067569
§ 371 (c)(1),
(2), (4) Date: Sep. 20, 2011

(87) PCT Pub. No.: WO2010/116551
PCT Pub. Date: Oct. 14, 2010

(65) Prior Publication Data
US 2012/0008079 A1 Jan. 12, 2012

(30) Foreign Application Priority Data
Mar. 30, 2009 (JP) ................. 2009-083201

(51) Int. Cl.
*G02F 1/1337* (2006.01)
*C09K 19/38* (2006.01)
*C09K 19/32* (2006.01)
*C09K 19/12* (2006.01)
*C09K 19/20* (2006.01)

(52) U.S. Cl.
USPC ....... 428/1.1; 428/1.2; 428/1.26; 252/299.62; 252/299.67; 349/123; 349/130

(58) Field of Classification Search
USPC ............ 428/1.1; 252/299.62, 299.66, 299.67; 349/123, 130
See application file for complete search history.

(56) References Cited

U.S. PATENT DOCUMENTS 6,201,588 B1 3/2001 Walton et al.
6,597,422 B1 7/2003 Fuenfschilling et al.
(Continued)

FOREIGN PATENT DOCUMENTS

EP 1 498 468 A1 1/2005
JP 10-227998 8/1998
(Continued)

OTHER PUBLICATIONS

International Search Report for PCT/JP2010/053811, mailed Apr. 13, 2010.

*Primary Examiner* — Shean C Wu
(74) *Attorney, Agent, or Firm* — Nixon & Vanderhye, P.C.

(57) ABSTRACT

The present invention provides a liquid crystal display device capable of reducing the probability of image sticking. The liquid crystal display device includes a pair of substrates and a liquid crystal layer between the substrates. At least one of the substrates includes an alignment film and a polymer layer on the alignment film. The polymer layer includes monomer units derived from at least two species of polymerizable monomers. The at least two species of polymerizable monomers include at least two species of monomers selected from the group consisting of: specific polyfunctional monomers and specific monofunctional monomers.

24 Claims, 2 Drawing Sheets

(56) References Cited

U.S. PATENT DOCUMENTS

| | | |
|---|---|---|
| 7,643,124 B2 * | 1/2010 | Pai et al. ................ 349/167 |
| 2003/0231272 A1 | 12/2003 | Nakamura et al. |
| 2005/0116200 A1 | 6/2005 | Nakanishi et al. |
| 2005/0264737 A1 | 12/2005 | Kataoka et al. |
| 2008/0124493 A1 | 5/2008 | Sawatari et al. |
| 2008/0236727 A1 | 10/2008 | Hsieh et al. |
| 2009/0086139 A1 * | 4/2009 | Pai et al. ................ 349/123 |
| 2009/0268138 A1 | 10/2009 | Nakamura |
| 2011/0101269 A1 | 5/2011 | Bernatz et al. |

FOREIGN PATENT DOCUMENTS

| | | |
|---|---|---|
| JP | 10-268318 | 10/1998 |
| JP | 2002-532755 | 10/2002 |
| JP | 2003-307720 | 10/2003 |
| JP | 2005-258428 | 9/2005 |
| JP | 2006-215184 | 8/2006 |
| JP | 2008-076950 | 4/2008 |
| WO | 2006/093131 A1 | 9/2006 |
| WO | WO 2009/030322 A1 | 3/2009 |

* cited by examiner

LIQUID CRYSTAL DISPLAY DEVICE, PROCESS FOR PRODUCING LIQUID CRYSTAL DISPLAY DEVICE, COMPOSITION FOR FORMING POLYMER LAYER, AND COMPOSITION FOR FORMING LIQUID CRYSTAL LAYER

This application is the U.S. national phase of International Application No. PCT/JP2009/067569, filed 8 Oct. 2009, which designated the U.S. and claims priority to JP Application No. 2009-083201, filed 30 Mar. 2009, the entire contents of each of which are hereby incorporated by reference.

TECHNICAL FIELD

The present invention relates to a liquid crystal display device, a method for producing a liquid crystal display device, a composition for a polymer layer, and a composition for a liquid crystal layer. More specifically, the present invention relates to a liquid crystal display device having a polymer layer formed on an alignment film; a method for producing a liquid crystal display device which includes the steps of forming a resin film and forming a polymer layer on this alignment film; a composition for a polymer layer which is suitable for polymer layer formation; and a composition for a liquid crystal layer which is suitable for polymer layer formation.

BACKGROUND ART

Liquid crystal displays (LCDs) are display devices that control transmission/reflection of light (ON/OFF of display) by controlling the alignment of birefringent liquid crystal molecules. One way to align liquid crystal molecules is to adopt a structure in which an alignment film subjected to an alignment treatment such as a rubbing treatment or a photo-alignment treatment is located in contact with a liquid crystal layer.

Alternatively, like in the multi-domain vertical alignment (MVA) mode, the alignment of liquid crystal molecules may be controlled by means of bank-like protrusions of a dielectric material extending in an oblique direction on a common electrode, slits parallel to such bank-like protrusions on pixel electrodes, or the like structures, without performing any alignment treatment.

In the case of an MVA mode liquid crystal display device, liquid crystal molecules are in the vertical alignment to a substrate surface while no voltage is applied. Once a voltage is applied between a pixel electrode and a common electrode, the liquid crystal molecules become tilted at an angle corresponding to the voltage applied. In each pixel, there are some regions (domains) in which liquid crystal molecules are tilted in different directions due to slits on pixel electrodes or bank-like protrusions. These regions, in which liquid crystal molecules are tilted in different directions, in each pixel provide better display quality.

Disadvantageously, the regions with slits or protrusions tend to have lower light transmittance. The light transmittance can be increased by simply arranging such bank-like protrusions or pixel electrode slits with larger intervals. However, too large intervals between bank-like protrusions or slits prolong the time required for a change in the angles of all liquid crystal molecules, and therefore lead to a very slow response speed of the liquid crystal molecules to application of a voltage necessary for display to a liquid crystal layer.

A technology to improve the response delay has already been put into practical use. Specifically, in this technology, a polymer layer memorizing tilt directions of liquid crystal molecules is formed on an alignment film by injecting a liquid crystal material containing polymerizable monomers between substrates, and polymerizing the monomers while applying a voltage (hereinafter, this technology is also referred to as "PSA (polymer Sustained Alignment) technology") (see, for example, Patent Documents 1 and 2).

Patent Document 1: JP 2003-307720 A
Patent Document 2: JP 2008-076950 A

DISCLOSURE OF INVENTION

However, even liquid crystal display devices including an alignment film produced by the PSA technology often have image sticking in their liquid crystal displays. Possible main causes of image sticking are as follows: pretilt angles are likely to be changed due to light emitted from a backlight or an applied AC voltage in the case where the binding force between monomer units in a polymer layer (hereinafter, also referred to as a PSA layer) produced by the PSA technology is not enough; and a residual DC voltage is generated in the alignment film and the PSA layer due to inpurities attached on the PEA layer or low resistance of the PSA layer.

The present invention has been made in view of the above problems and aims to provide a liquid crystal display device capable of reducing the probability of image sticking.

Means for Solving the Problems

After studies on various means for preventing changes in pretilt angles and various means for inhibiting residual DC voltage generation, the present inventors focused on polymerizable monomers used in the PSA polymerization process and found out that when each of these polymerizable monomers is used singly as in the conventional techniques, the probability of image sticking in liquid crystal displays is high; however, when different kinds of these monomers are used in combination, the probability of image sticking in liquid crystal displays can be reduced to a low level. Thus, the present inventors found a solution for the above problems and achieved the present invention.

The present invention provides a liquid crystal display device including a pair of substrates and a liquid crystal layer between the substrates. At least one of the substrates includes an alignment film and a polymer layer on the alignment film. The polymer layer includes monomer units derived from at least two species of polymerizable monomers. The at least two species of polymerizable monomers include at least two species of monomers selected from the group consisting of polyfunctional monomers represented by the following formula (I) and monofunctional monomers represented by the following formula (II).

$$P^1\text{-}S^1\text{-}A^1\text{-}(Z^1\text{-}A^2)_n S^2\text{-}P^2 \tag{I}$$

In the formula, $P^1$ and $P^2$, which are the same or different, each represent an acrylate group, methacrylate group, acrylamide group, methacrylamide group, vinyl group, vinyloxy group, or epoxy group; $A^1$ and $A^2$ each represent a 1,4-phenylene group, naphthalene-2,6-diyl group, anthracene-2,6-diyl group or phenanthrene-2,6-diyl group; all or part of hydrogen atoms of $A^1$ and $A^2$ may be substituted with halogens and/or methyl groups; $Z^1$ represents COO, OCO, O, CO, NHCO, CONH, S, or a direct bond between $A^1$ and $A^2$, or $A^2$ and $A^2$; n is 0, 1, or 2; $S^1$ and $S^2$, which are the same or different, each represent $(CH_2)_m$ ($1 \leq m \leq 6$), $(CH_2\text{---}CH_2\text{---}O)_m$ ($1 \leq m \leq 6$) or a direct bond between $P^1$ and $A^1$, $A^1$ and $P^2$, or $A^2$ and $P^2$.

$$P^3\text{-}S^3\text{-}A^3 \tag{II}$$

In the formula, $P^3$ represents an acrylate group, methacrylate group, acrylamide group, methacrylamide group, vinyl group, vinyloxy group, or epoxy group; $A^3$ represents a phenyl group, biphenyl group, naphthalene group, anthracene group, or phenanthrene group; all or part of hydrogen atoms of $A^3$ may be substituted with halogens and/or methyl groups; and $S^3$ represents $(CH_2)_m (CH_2-CH_2-O)_m$ ($1 \leq m \leq 6$) or a direct bond between $P^3$ and $A^3$.

For example, one of the substrates in the liquid crystal display device of the present invention serves as an array substrate and the other serves as a color filter substrate. The array substrate includes a plurality of pixel electrodes and these electrodes control the alignment of liquid crystal molecules in each pixel. In the color filter substrate, a set of color filters such as an R (red) filter, a G (green) filter and a B (blue) filter is provided at each position in one-to-one correspondence with the pixel electrodes on the array substrate, enabling control of a color to be displayed for each pixel.

At least one of the substrates in the liquid crystal display device of the present invention includes an alignment film. The term "alignment film" herein means a film for aligning liquid crystal molecules in vicinity thereto in predetermined directions, and is intended to include both of films subjected to an alignment treatment and films not subjected to any alignment treatment. Examples of the alignment film include resin films. The alignment film may be, for example, a resin film formed from a common vertical alignment film material without performing any alignment treatment, or a resin film formed from a common horizontal alignment film material without performing any alignment treatment. In the case of performing an alignment treatment, a rubbing treatment or a photo-alignment treatment may be performed as the alignment treatment.

The polymer layer includes a polymer containing monomer units derived from at least two species of polymerizable monomers. Examples of the polymerizable monomers include polymerizable monomers that polymerize (photopolymerize) when exposed to light, and polymerizable monomers that polymerize (thermally polymerize) when heated. As the result of polymerization, the polymer layer is formed. Among these monomers, preferred are monomers that photopolymerize because photopolymerization is easily initiated at normal temperature. In the present invention, the polymerization for forming the PSA layer (polymer layer) is not particularly limited, and examples thereof include "successive polymerization" in which bi-functional monomers form a new bond one by one to form a polymer, and "chain polymerization" in which monomers successively bond to an activated species generated from a small amount of a catalyst (initiator) so that a polymer chain successively grows. Examples of the successive polymerization include polycondensation and polyaddition. Examples of the chain polymerization include radical polymerization and ionic polymerization (e.g. anionic polymerization, cationic polymerization).

The polymer layer enables the alignment film to regularly align liquid crystal molecules in vicinity to the alignment film in predetermined directions even if any alignment treatment is not performed. For example, in the case where the polymer layer is formed by polymerizing monomers in a state that liquid crystal molecules are pretilted, the polymer layer pretilts liquid crystal molecules, whether or not the alignment film is subjected to an alignment treatment.

The at least two species of polymerizable monomers include at least two species of monomers selected from the group consisting of polyfunctional monomers represented by the formula (I) and monofunctional monomers represented by the formula (II) In other words, in the present invention, the number of species of polymerizable monomers constituting the PSA layer (polymer layer) is two or more, and two species of the polymerizable monomers are monomers represented by the formula (I) or (II) Specifically, the combination of these two species of polymerizable monomers can be as follow: two polyfunctional monomers represented by the formula (I); two monofunctional monomers represented by the formula (II); a polyfunctional monomer represented by the formula (I) and a monofunctional monomer represented by the formula (II). In the case of a combination of two polyfunctional monomers represented by the formula (I) or a combination of two monofunctional monomers represented by the formula (II), they are both represented by the same formula but should be different, for example, in any or some of $P^1$, $S^1$, $A^1$, $Z^1$, $A^2$, $S^2$, $P^2$, $P^3$, $S^3$ and $A^3$.

The weight ratio between the at least two species of polymerizable monomers is not particularly limited. The monomer with the highest weight among the at least two species of polymerizable monomers may be a polyfunctional monomer represented by the formula (I), a monofunctional monomer represented by the formula (II), or a monomer other than monomers of the formulae (I) and (II).

Among the at least two species of monomers represented by the formula (I) and/or the formula (II), one serves to prevent changes in the pretilt angle and the other serves to prevent residual DC voltage generation. Thus, these two species of monomers are used to achieve benefits of preventing the two causes of image sticking and to provide a high-quality liquid crystal display device.

The liquid crystal display device of the present invention includes these essential components and may or may not include other components. Hereinafter, preferred embodiments of the liquid crystal display device of the present invention are described in more detail.

One of the at least two species of polymerizable monomers is preferably a polyfunctional monomer represented by the formula (I). This is because polymers containing polyfunctional monomer units are more rigid than polymers of monofunctional monomers and thereby more successively suppress changes in the pretilt angle caused by an applied AC voltage than polymers of monofunctional monomers.

Preferably, both of $P^1$ and $P^2$ represent a methacrylate group, $Z^1$ represents a direct bond between $A^1$ and $A^2$, or $A^2$ and $A^2$, and n is 0 or 1.

Preferably, $A^1$ represents a 1,4-phenylene group, $A^2$ represents a 1,4-phenylene group, and $A^3$ represents a phenyl group.

Preferably, the at least two species of polymerizable monomers are two species of polymerizable monomers.

Preferably, both of the two species of polymerizable monomers are polyfunctional monomers represented by the formula (I). This is because polymers of polyfunctional monomers are more rigid than polymers of monofunctional monomers and more successively suppress changes in the pretilt angle caused by an applied AC voltage than polymers of monofunctional monomers.

Preferably, both of the two species of polymerizable monomers are polyfunctional monomers represented by the formula (I), both of $P^1$ and $P^2$ represent a methacrylate group, $Z^1$ represents a direct bond between $A^1$ and $A^2$, or $A^2$ and $A^2$, and n is 0 or 1.

Preferably, one of the two species of polymerizable monomers includes a 1,4-phenylene group at $A^1$, and a weight ratio of the polymerizable monomer including a 1,4-phenylene group at $A^1$ is larger than a weight ratio of the other polymerizable monomer.

Preferably, both of the substrates have electrodes, and the polymer layer is formed by a polymerization reaction while a voltage not lower than a threshold voltage is applied to the liquid crystal layer through the electrodes. In this case, the pretilt alignment of liquid crystal molecules is more stabilized, and the time required for a change in the angles of all the liquid crystal molecules after voltage application is shortened; in other words, a response time is improved. In addition, an effect of preventing image sticking can be achieved.

Preferably, the alignment film is formed from a material containing a polyimide or a polyimide. In the case of a polyimide, the imide structure of the polyimide backbone improves the thermal stability. Polyamides provide higher thermal stability than polyvinyls although the thermal stability of polyamides is lower than the thermal stability of polyimides. Further, polyamides are more soluble than polyimides and allow easy film formation by printing, ink-jetting or the like. In addition, polyamides can be easily synthesized by polycondensation.

Preferably, the polyimide or polyimide includes a side chain containing a photoactive functional group. Such a polymer for the alignment film, which includes a side chain containing a photoactive functional group, can be used as a photo-alignment material for the alignment film without largely changing the backbone structure. In the case where the film is subjected to a photo-alignment treatment, the probability of damage to components below the alignment film (e.g. TFTs) can be reduced, compared to the case where the film is subjected to a contact treatment such as rubbing. In this case, the 4D-RTN mode that can control inclination of liquid crystal molecules in four different alignment directions in every pixel is easily achieved since the alignment given by a photo-alignment treatment can be controlled by the radiation angle and intensity of light or other factors.

The photoactive functional group is preferably a cinnamate group, chalcone group, tolane group, coumarin group, or azobenzene group. These photoactive functional groups can be comparatively easily introduced into a side chain of the polymer and are highly reactive.

Preferably, the polyimide or polyamide is a copolymer that contains a monomer unit including a side chain containing the photoactive functional group and a monomer unit including a side chain free from photoactive functional groups.

Preferably, the alignment film is configured to align liquid crystal molecules in the liquid crystal layer regularly in a direction vertical to a resin film surface while no voltage is applied to the liquid crystal layer. In the case where the liquid crystal display device is in a mode in which liquid crystal molecules have negative dielectric anisotropy (e.g. vertical alignment (VA) mode, MVA mode), the alignment film configured as described above can improve the response speed.

Preferably, the alignment film is configured to align liquid crystal molecules in the liquid crystal layer regularly in a direction horizontal to a surface of the alignment film while no voltage is applied to the liquid crystal layer. In the case where the liquid crystal display device is in a mode in which liquid crystal molecules have positive dielectric anisotropy (e.g. twisted nematic (TN) mode, in-plane switching (IPS) mode), the alignment film configured as described above can improve the response speed.

Preferably, the alignment film is configured to align liquid crystal molecules in the liquid crystal layer regularly in a direction oblique to a surface of the alignment film while no voltage is applied to the liquid crystal layer. Such an alignment film can be prepared by performing an alignment treatment such as a rubbing treatment or a photo-alignment treatment on a common resin material, a vertical alignment film material or a horizontal alignment film material. If the PSA film is formed on such an alignment film, the PSA film serves to further enhance the alignment control ability of the alignment film, resulting in lower probability of image sticking. In addition, it is unnecessary to apply a voltage not lower than a threshold voltage to the liquid crystal layer during the PSA polymerization step. Namely, in this case, even in the case where the PSA polymerization step is performed while no voltage is applied, this structure makes it possible to achieve an identical image-sticking prevention effect to that achieved in the case where the PSA polymerization step is performed while a voltage not lower than a threshold is applied to the liquid crystal layer.

Preferably, the liquid crystal display device includes a plurality of pixels, the liquid crystal layer is divided into regions that are in one-to-one correspondence with the pixels, and each of the regions of the liquid crystal layer is divided into a plurality of subregions whose alignment directions of liquid crystal molecules are different from one another. The structure in which each pixel region has a plurality of subregions whose alignment directions of liquid crystal molecules are different provides a display that appears the same even when viewed from different angles. In this way, the viewing angle characteristic is improved. Such an alignment-divided structure can be achieved, for example, by forming linear bank-like protrusions made of a dielectric material on electrodes or forming linear slits in the electrodes, or by changing the radiation angle of light in the process of forming a photo-alignment film, so that the resulting alignment film has different pretilt angles.

Preferably, the number of the subregions is four. These four subregions provide an improved display even when the viewing angle is inclined to any directions: up, down, left and right relative to the normal line of the display screen, that is, the viewing angle characteristic is improved in a balanced manner.

The present invention also provides a method for producing a liquid crystal display device including a pair of substrates and a liquid crystal layer between the substrates. The method includes the steps of: forming an alignment film on at least one of the substrates; and forming a polymer layer on the alignment film by a polymerization reaction between at least two species of polymerizable monomers. The at least two species of polymerizable monomers include at least two species of monomers selected from the group consisting of: polyfunctional monomers represented by the formula (I), and monofunctional monomers represented by the formula (II).

Also, in the production method of the present invention, as described for the liquid crystal display device of the present invention, one of the at least two species of polymerizable monomers is preferably a polyfunctional monomer represented by the formula (I). Preferably, both of $P^1$ and $P^2$ represent a methacrylate group, $Z^1$ represents a direct bond between $A^1$ and $A^2$, or $A^2$ and $A^2$, n is 0 or 1, $A^1$ represents a 1,4-phenylene group, $A^2$ represents a 1,4-phenylene group, and $A^3$ represents a phenyl group. Preferably, the at least two species of polymerizable monomers are two species of polymerizable monomers, and both of the two species of polymerizable monomers are polyfunctional monomers represented by the formula (I). Preferably, both of the two species of polymerizable monomers are polyfunctional monomers represented by the formula (I), both of $P^1$ and $P^2$ represent a methacrylate group, $Z^1$ represents a direct bond between $A^1$ and $A^2$, or $A^2$ and $A^2$, and n is 0 or 1. Preferably, one of the two species of polymerizable monomers includes a 1,4-phenylene group at $A^1$, and a weight ratio of the polymerizable monomer including a 1,4-phenylene group at $A^1$ is larger than a weight ratio of the other polymerizable monomer.

In addition, in the production method of the present invention, the alignment film is preferably formed from a material containing a polyimide or polyamide. Preferably, the polyimide or polyamide includes a side chain containing a photoactive functional group, and the photoactive functional group is a cinnamate group, chalcone group, tolane group, coumarin group or azobenzene group. Preferably, the polyimide or polyamide includes a copolymer containing a monomer unit including a side chain containing the photoactive functional group and a monomer unit including a side chain free from photoactive functional groups. Preferably, the alignment film is configured to align liquid crystal molecules in the liquid crystal layer regularly in a direction vertical to the alignment film surface while no voltage is applied to the liquid crystal layer, or is configured to align liquid crystal molecules in the liquid crystal layer regularly in a direction horizontal to the alignment film surface while no voltage is applied to the liquid crystal layer, or is configured to align liquid crystal molecules in the liquid crystal layer regularly in a direction oblique to the alignment film surface while no voltage is applied to the liquid crystal layer.

The production method preferably includes the step of dissolving the at least two species of polymerizable monomers in a liquid crystal material before the step of forming a polymer layer. Addition of the at least two species of polymerizable monomers in a liquid crystal material improves the efficiency of polymer layer formation.

In the production method, the step of forming a polymer layer preferably includes polymerizing the polymerizable monomers while applying a voltage not lower than a threshold voltage to the liquid crystal layer. In this case, the pretilt alignment of liquid crystal molecules is more stabilized, and the time required for a change in the angles of all the liquid crystal molecules after voltage application is started or ended, that is, a response time is improved. In addition, the probability of image sticking in a resulting liquid crystal display device can be reduced.

In the production method, the step of forming an alignment film preferably includes an alignment treatment by light irradiation. The alignment treatment by light irradiation can reduce the probability of damage to components below the alignment film (e.g. TFTs), compared to contact treatments such as rubbing. Also, this alignment treatment facilitates production of devices of the 4D-RTN mode that can control inclination of liquid crystal molecules in four different alignment directions in every pixel since the alignment given by a photo-alignment treatment can be controlled by the radiation angle and intensity of light or other factors. Accordingly, a wide viewing angle is easily achieved. Preferably, the liquid crystal display device includes a plurality of pixels, and the alignment treatment is a step of dividing each of regions of the liquid crystal layer which are in one-to-one correspondence with the pixels into a plurality of subregions whose alignment directions of liquid crystal molecules are different from one another. The number of the subregions is preferably four.

Further, the present invention provides a composition for a polymer layer, which includes at least two species of polymerizable monomers. The at least two species of polymerizable monomers include at least two species of monomers selected from the group consisting of polyfunctional monomers represented by the formula (I) and monofunctional monomers represented by the formula (II).

Also, in the composition, as described for the liquid crystal display device and the method for producing a liquid crystal display device of the present invention, one of the at least two species of polymerizable monomers is preferably a polyfunctional monomer represented by the formula (I). Preferably, both of $P^1$ and $P^2$ represent a methacrylate group, $Z^1$ represents a direct bond between $A^1$ and $A^2$, or $A^2$ and $A^2$, n is 0 or 1, $A^1$ represents a 1,4-phenylene group, $A^2$ represents a 1,4-phenylene group, and $A^3$ represents a phenyl group. Preferably, the at least two species of polymerizable monomers are two species of polymerizable monomers, and both of the two species of polymerizable monomers are polyfunctional monomers represented by the formula (I). Preferably, both of the two species of polymerizable monomers are polyfunctional monomers represented by the formula (I), both of $P^1$ and $P^2$ represent a methacrylate group, $Z^1$ represents a direct bond between $A^1$ and $A^2$, or $A^2$ and $A^2$, and n is 0 or 1. Preferably, one of the two species of polymerizable monomers includes a 1,4-phenylene group at $A^1$, and a weight ratio of the polymerizable monomer including a 1,4-phenylene group at $A^1$ is larger than a weight ratio of the other polymerizable monomer.

If the composition for a polymer layer of the present invention is added to a liquid crystal material, the polymerizable monomers are effectively polymerized under application of a voltage not lower than a threshold voltage to a liquid crystal layer. As a result, a polymer layer is effectively formed. Accordingly, the present invention provides a composition for a liquid crystal layer which contains a liquid crystal material as well as the composition for a polymer layer.

Effects of the Invention

Since the liquid crystal display device of the present invention includes a polymer layer made of a polymer that contains monomer units of at least two species of monomers, on an alignment film, the liquid crystal display device of the present invention can achieve both of a benefit of preventing image sticking caused by a change in the pretilt angle and benefit of preventing image sticking caused by a residual DC voltage.

MODES FOR CARRYING OUT THE INVENTION

Hereinafter, the present invention is described in more detail by way of an embodiment referring to drawings, but the present invention is not limited to this embodiment.

First Embodiment

Figure 1:
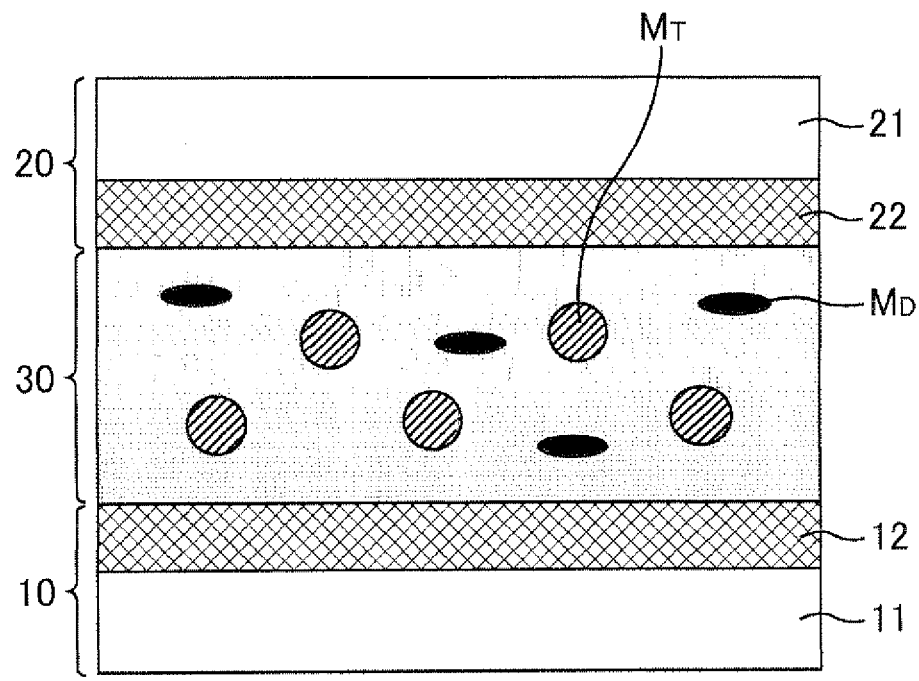
FIG. 1 is a schematic cross-sectional view of a liquid crystal display device according to a first embodiment before a PSA polymerization step.
Figure 2:
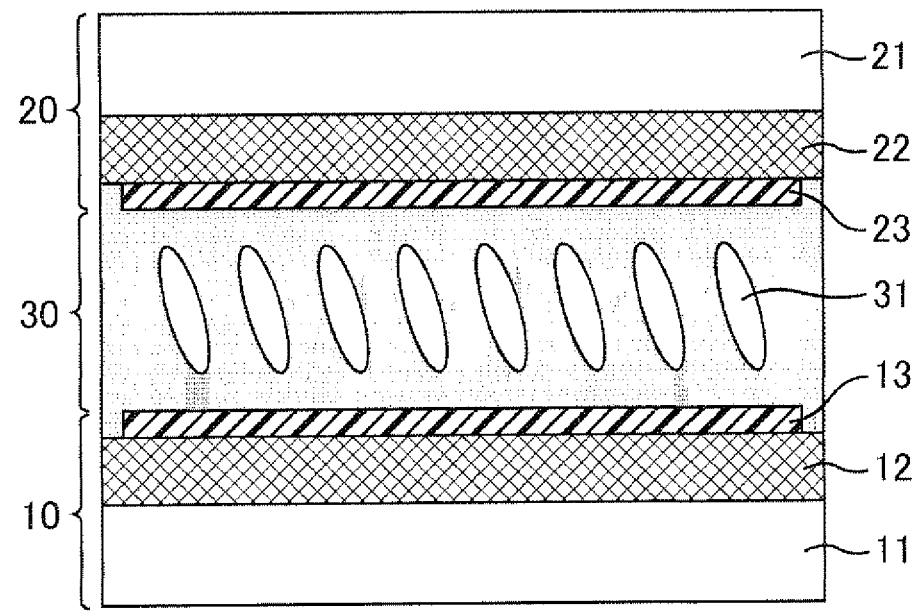
FIG. 2 is a schematic cross-sectional view of the liquid crystal display device according to the first embodiment after the PSA polymerization step.

FIGS. 1 and 2 are schematic cross-sectional views of a liquid crystal display device according to the first embodiment. FIG. 1 shows the device before a PSA polymerization step and FIG. 2 shows the device after the PSA polymerization step. As shown in FIGS. 1 and 2, the liquid crystal display device according to the first embodiment includes a pair of substrates (i.e. an array substrate 10 and a color filter substrate 20), a liquid crystal layer 30 between the array substrate 10 and the color filter substrate 20. The array substrate 10 includes a supporting substrate 11 which includes an insulating transparent substrate such as a glass substrate, lines of various types, pixel electrodes, TFTs, and the like on the transparent substrate. The color filter substrate 20 includes a supporting substrate 21 which includes an insulating transparent substrate such as a glass substrate, color filters, a black matrix, a common electrode, and the like on the transparent substrate.

The array substrate 10 includes an alignment film 12 on the supporting substrate 11, and the color filter substrate 20 includes an alignment film 22 on the supporting substrate 21. The alignment films 12 and 22 are mainly made of a polyimide, polyamide, polyvinyl, polysiloxane, or the like. An alignment treatment, such as a rubbing treatment or a photo-alignment treatment, is performed on the surfaces of the alignment films 12 and 22 so that liquid crystal molecules are aligned at a vertical or horizontal pretilt angle (initial tilt). If the liquid crystal display is in a VA mode, these alignment films 12 and 22 are preferably vertical alignment films. The vertical alignment films are a type of alignment films that align liquid crystal molecules at a pretilt angle of 90° without any alignment treatment, and are formed from a polymer containing a side chain longer than common polymers.

As shown in FIG. 1, two species of polymerizable monomers, that is, a polymerizable monomer $M_T$ (monomer for reducing pretilt image sticking) and a polymerizable monomer $M_D$ (monomer for reducing DC image sticking) are present in the liquid crystal layer 30 before the PSA polymerization step. In the PSA polymerization step, the polymerizable monomers $M^T$ and $M_D$ are polymerized to form the PSA layers 13 and 23 on the alignment films 12 and 22, as shown in FIG. 2.

Specifically, the PSA layers 13 and 23 can be formed by preparing a composition for a liquid crystal layer by adding a composition for a polymer layer which contains at least two species of polymerizable monomers, to a liquid crystal material; injecting the composition between the array substrate 10 and the color substrate 20; and photo-polymerizing the polymerizable monomers by irradiating the liquid crystal layer 30 with a certain amount of light.

In the first embodiment, the liquid crystal layer 30 is irradiated with light in the PSA polymerization step while a voltage not lower than a threshold voltage is applied to the liquid crystal layer 30. As a result, a structure of polymers is formed in accordance with the alignment of the liquid crystal molecules tilted by the voltage not lower than a threshold voltage Therefore, the PSA layers can function as alignment films that align the liquid crystal molecules at an initial pretilt angle even when no voltage is applied.

In the first embodiment, if the alignment films 12 and 22 are subjected to an alignment treatment, the light irradiation may be performed without applying a voltage not lower than a threshold voltage to the liquid crystal layer 30. In this case, since the alignment films 12 and 22 by themselves are able to align the liquid crystal molecules in the pretilt alignment, the PSA layers 13 and 23 on the alignment films 12 and 22 further enhance the alignment stabilizing ability of the alignment films. As the ability of the alignment films 12 and 22 to control the alignment is enhanced, the liquid crystal molecules 31 are more uniformly controlled in alignment, and therefore the alignment is less likely to change with the passage of time and the probability of image sticking on a display can be reduced. In the first embodiment, the alignment films may be subjected to an alignment treatment, and in addition, the PSA layers 13 and 23 may be formed by light irradiation while a voltage not lower than a threshold is applied to the liquid crystal layer 30. In this case, both of the alignment films 12 and 22 and the PSA layers 13 and 23 more successively stabilize the alignment.

In the first embodiment, the alignment of the liquid crystal molecules may be provided, for example, by linear slits formed in the pixel electrodes of the supporting substrate 11 or in the common electrode of the supporting substrate 12. If thin linear slits are formed in the pixel electrodes and/or common electrode, the liquid crystal molecules are uniformly aligned along the slits while no voltage is applied. Accordingly, the PSA layers can align the liquid crystal molecules at a pretilt angle even when a voltage not lower than a threshold value is not applied to the liquid crystal layer 30.

Instead of the thin linear slits in the pixel electrodes or common electrode, thin linear dielectric protrusions may be formed on the pixel electrodes and/or common electrode. Also, in this case, the liquid crystal molecules are uniformly aligned along the protrusions while no voltage is applied. Accordingly, the PSA layers can align the liquid crystal molecules at a pretilt angle even when a voltage not lower than a threshold value is not applied to the liquid crystal layer 30.

In the first embodiment, the alignment of the liquid crystal molecules may be provided by both of thin linear slits in the pixel electrodes or common electrode, and thin linear dielectric protrusions on the pixel electrodes or common electrode.

In the first embodiment, at least two species of polymerizable monomers are used. The at least two species of polymerizable monomers include at least two species of monomers selected from the group consisting of polyfunctional monomers represented by the formula (I) and monofunctional monomers represented by the formula (II).

$$P^1\text{-}S^1\text{-}A^1\text{-}(Z^1\text{-}A^2)_n\text{-}S^2\text{-}P^2 \qquad (I)$$

In the formula, $P^1$ and $P^2$, which are the same or different, each represent an acrylate group, methacrylate group, acrylamide group, methacrylamide group, vinyl group, vinyloxy group, or epoxy group; $A^1$ and $A^2$ each represent a 1,4-phenylene group, naphthalene-2,6-diyl group, anthracene-2,6-diyl group or phenanthrene-2,6-diyl group; $Z^1$ represents COO, OCO, O, CO, NHCO, CONH, S, or a direct bond between $A^1$ and $A^2$, or $A^2$ and $A^2$, n is 0, 1, or 2; $S^1$ and $S^2$, which are the same or different, each represent $(CH_2)_m$ ($1 \leq m \leq 6$), $(CH_2\text{—}CH_2\text{—}O)_m$ ($1 \leq m \leq 6$) or a direct bond between $P^1$ and $A^1$, $A^1$ and $P^2$, or $A^1$ and $P^2$; and all or part of hydrogen atoms of $A^1$ and $A^2$ may be substituted with halogens and/or methyl groups.

$$P^3\text{-}S^3\text{-}A^3 \qquad (II)$$

In the formula, $P^3$ represents an acrylate group, methacrylate group, acrylamide group, methacrylamide group, vinyl group, vinyloxy group, or epoxy group; $A^3$ represents a phenyl group, biphenyl group, naphthalene group, anthracene group, or phenanthrene group; all or part of hydrogen atoms of $A^3$ may be substituted with halogens and/or methyl groups; and $S^3$ represents $(CH_2)_m$ ($1 \leq m \leq 6$), $(CH_2\text{—}CH_2\text{—}O)_m$ ($1 \leq m \leq 6$) or a direct bond between $P^3$ and $A^3$.

Examples of the functional group at $A^3$ include structures represented by the following formulae (1-1) to (1-13).

[Chem 1]

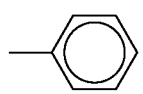

(1-1)

(1-2) 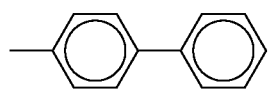

(1-3) 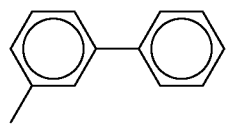

(1-4) 

(1-5) 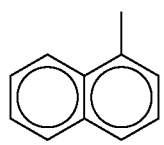

(1-6) 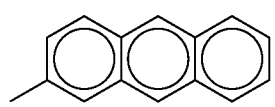

(1-7) 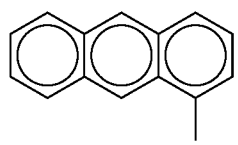

(1-8) 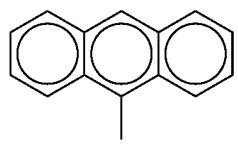

(1-9) 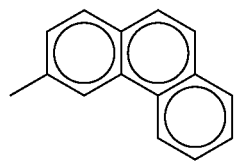

(1-10) 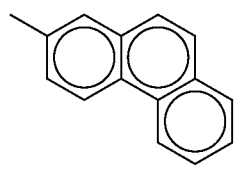

(1-11) 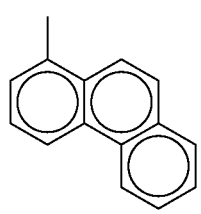

(1-12) 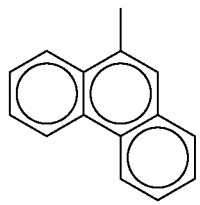

(1-13) 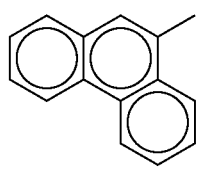

The use of at least two species of polymerizable monomers produces an effect of preventing image sticking. Among the at least two species of monomers before the polymerization reaction, a polymerizable monomer $M_T$ eliminates the cause of image sticking caused by a change in the pretilt angle, and a polymerizable monomer $M_D$ eliminates the cause of image sticking caused by a residual DC voltage in the alignment films and PSA layers. In terms of image sticking prevention, a weight ratio of the polymerizable monomer $M_T$ is preferably larger than a weight ratio of the polymerizable monomer $M_D$ ($M_T \geq M_D$).

Other components of the liquid crystal display device according to the first embodiment are described in detail.

In the first embodiment, if the alignment films 12 and 22 are subjected to a photo-alignment treatment, for example, the probability of damage to TFTs of the supporting substrate 11 can be reduced. In this case, alignment division of pixels is facilitated, compared to the case where the alignment films are subjected to a rubbing treatment.

Hereinafter, a photo-alignment treatment as an alignment treatment, that is, a method for forming a photo-alignment film is described in detail. First, a solution prepared by dissolving a photo-alignment film material including a photoactive functional group in a solvent is applied, by printing or the like, to a supporting substrate on which an alignment film is to be formed. The applied solution is pre-baked, and baked so as to evaporate the solvent. In this way, a base film is formed. The photoactive functional group may be of either a photo-coupling type or a photo-decomposition type. Examples of compounds including a photoactive functional group include polyamides represented by the following formula (2) and polyimides represented by the following formula (3). The functional groups Z in the formulae (2) and (3) (i.e. side-chain functional groups containing any of groups represented by the following formulae (6-1) to (6-6)) function as photoactive functional groups.

[Chem 2]

(2)

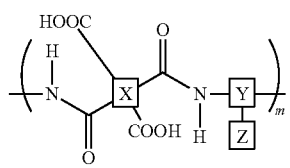

In the formula, X represents any of groups represented by the following formulae (4-1) to (4-8); Y represents any of groups represented by the following formulae (5-1) to (5-15); represents a side-chain functional group containing any of groups represented by the following formulae (6-1) to (6-6); and m represents the number of repetitions of the parenthesized structure and is a positive integer.

[Chem 3]

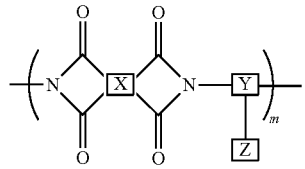

(3)

In the formula, X represents any of groups represented by the following formulae (4-1) to (4-8); Y represents any of groups represented by the following formulae (5-1) to (5-15); Z represents a side-chain functional group containing any of groups represented by the following formulae (6-1) to (6-6); and m represents the number of repetitions of the parenthesized structure and is a positive integer.

[Chem 4]

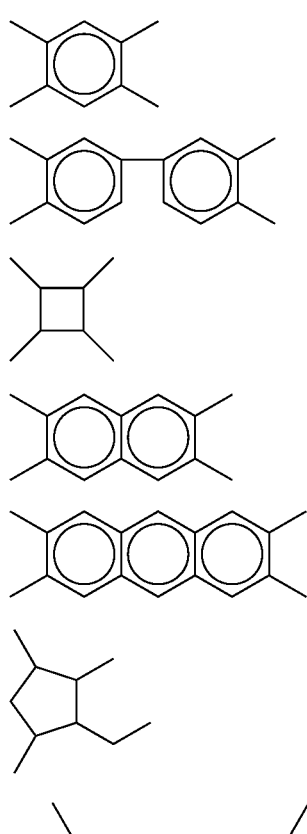

(4-1)

(4-2)

(4-3)

(4-4)

(4-5)

(4-6)

(4-7)

[Chem 5]

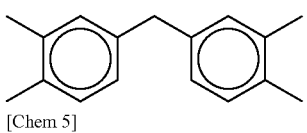

(4-8)

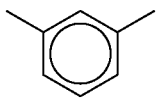

(5-1)

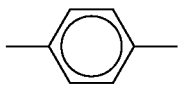

(5-2)

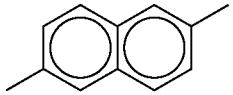

(5-3)

(5-4)

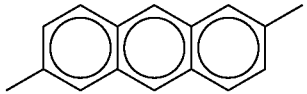

(5-5)

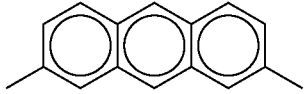

(5-6)

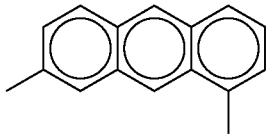

(5-7)

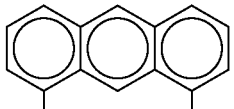

(5-8)

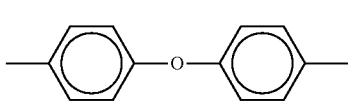

(5-9)

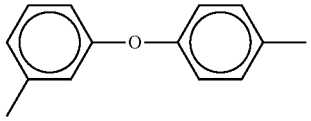

(5-10)

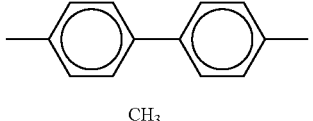

(5-11)

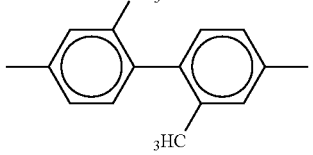

(5-12)

(5-13) 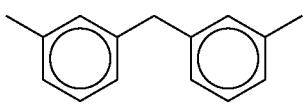

(5-14) 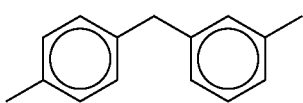

(5-15) 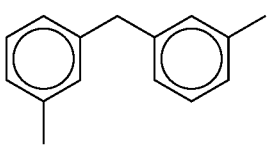

[Chem 6]

(6-1) 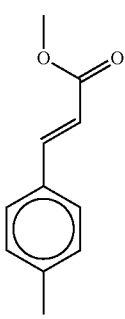

(6-2) 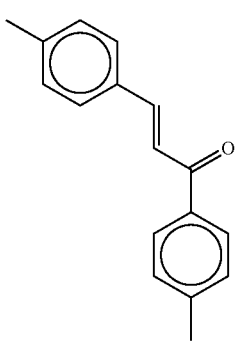

(6-3) 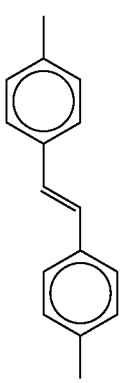

(6-4) 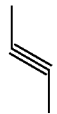

(6-5) 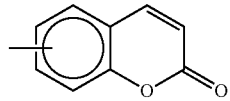

(6-6) 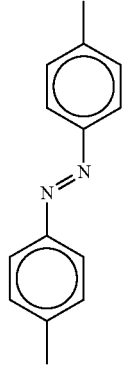

The photo-alignment film material used in the first embodiment may be a copolymer including a side chain containing a photoactive functional group and a side chain free from photoactive functional groups. Examples of such a copolymer include compounds represented by the following formulae (7) and (8).

[Chem 7]

(7)

In the formula, X represents any of groups represented by the formulae (4-1) to (4-8); Y represents any of groups represented by the formulae (5-1) to (5-15); Z represents a side-chain functional group containing any of groups represented by the formulae (6-1) to (6-6); W represents any of groups represented by the following formulae (9-1) to (9-6); m represents a ratio of monomer units in the copolymer and is a value in the range of 0 to 1; and n is a positive integer. In the following formulae (9-1) to (9-6), D and E, which may be the same or different, each represent a divalent group selected from the group consisting of O, CO, COO, OCO, NHCO, CONH, S, two phenylene groups coupled to each other by a direct bond, a methylene group, $C_{2-6}$ alkylene groups, and a phenylene group.

[Chem 8]

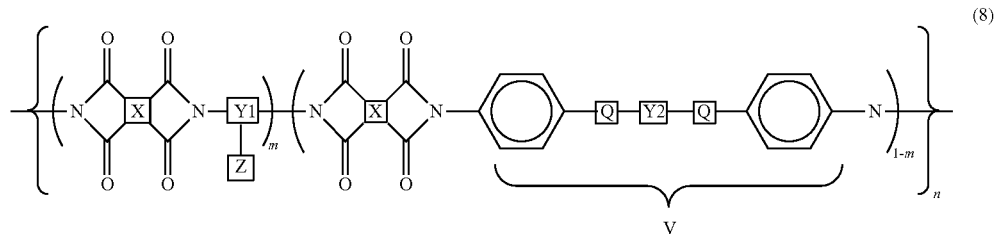

In the formula, X represents any of groups represented by the formulae (4-1) to (4-8); Y1 represents any of groups represented by the formulae (5-1) to (5-15); Y2 represents a divalent organic group with a $C_{4-40}$ alicyclic skeleton; Z represents a side-chain functional group containing any of groups represented by the formulae (6-1) to (6-6); Q represents O, CO, COO, OCO, NHCO, CONH, S or a direct bond between the phenylene group and Y2; m represents a ratio of monomer units in the copolymer and is a value in the range of 0 to 1; and n is a positive integer. Examples of the moiety V are shown as the following formulae (10-1) to (10-8). In the following formulae (10-1) to (10-8), A represents a phenylene group or a direct bond between the groups on the both sides of A; and B and C, which may be the same or different, each represent O, CO, COO, OCO, NHCO, CONH, S or a phenylene group.

[Chem 9]

(9-1)

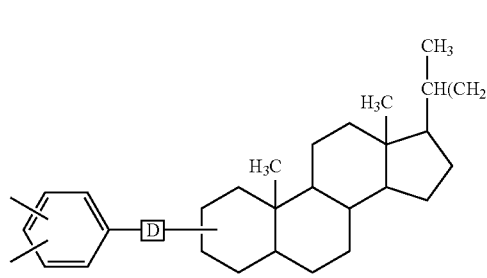

(9-2)

-continued (9-3)

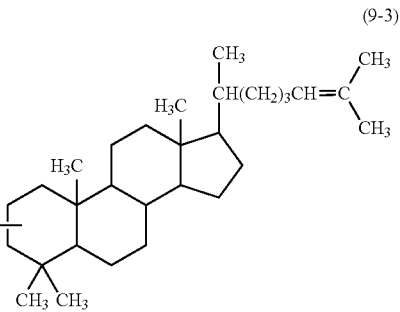

(9-4)

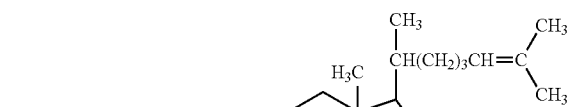
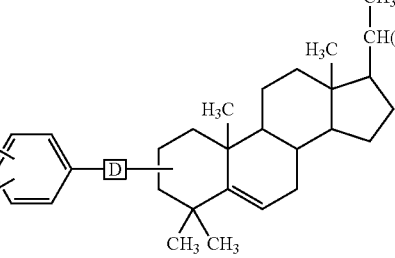

(9-5)

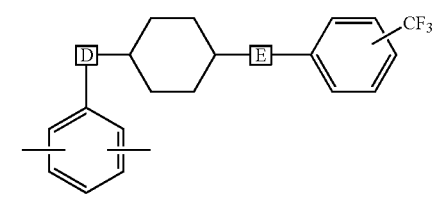

(9-6)

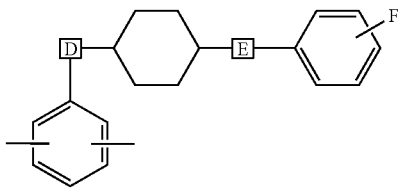

[Chem 10]

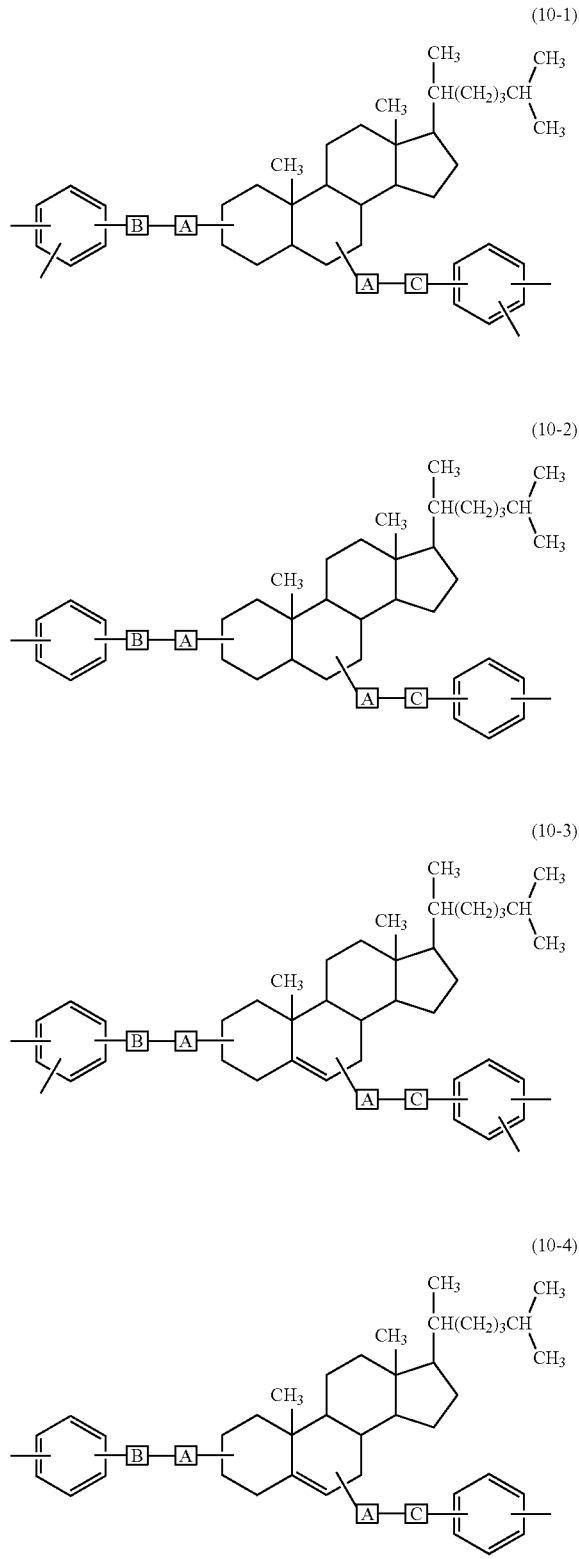

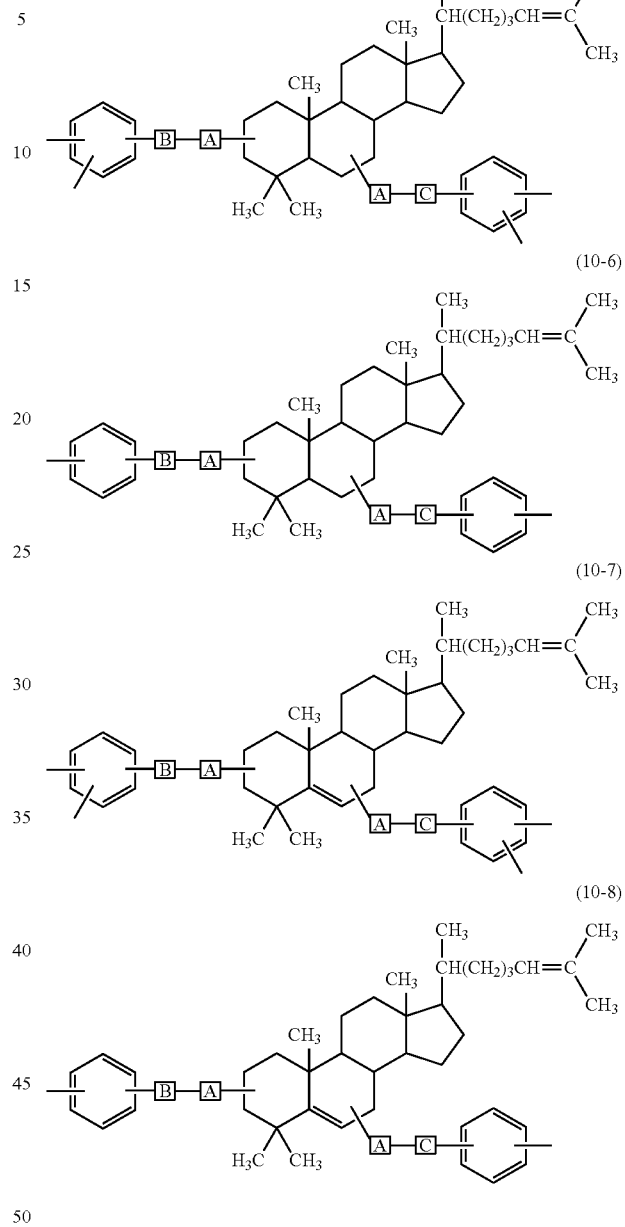

Next, the supporting substrate surface is irradiated, for example, with a predetermined dose of UV rays, preferably polarized UV rays from an oblique direction to the surface. In this way, a photo-alignment film is formed. The pretilt angle of the liquid crystal molecules given by the photo-alignment film can be adjusted by the irradiation time and intensity of light, the type of the photoactive functional group, and the like.

In this process, in the case of the type 4D-RTN (reverse twisted nematic) mode in which each pixel is divided into four domains, the viewing angle can be remarkably improved by performing the alignment treatment on the substrates in different directions perpendicular to each other. In the 4D-RTN mode, very precise pretilt control is required. The liquid crystal display device according to the first embodiment can achieve a satisfactory level of the alignment stability even in the case of the 4D-RTN mode because the pretilt alignment is highly stabilized by the PSA layers on the alignment layers.

In the liquid crystal display device according to the first embodiment, the array substrate 10, the liquid crystal layer 30, and the color filter substrate 20 are stacked in this order from the back surface to the screen side of the liquid crystal display device. The supporting substrate 11 of the array substrate 10 has a polarizing plate on its back surface. The supporting substrate 21 of the color filter substrate 20 also has a polarizing plate on the screen side. Further, retardation films may be disposed on these polarizing plates, and these polarizing plates may be circularly polarizing plates.

The liquid crystal display device according to the first embodiment may be of any of a transmission type, a reflection type, and a transflective type. In the case of a transmission or transflective type, the liquid crystal display device according to the first embodiment is further provided with backlight. The backlight is disposed on the back surface side of the array substrate 10, so that light emitted therefrom passes through the array substrate 10, the liquid crystal layer 30 and the color filter substrate 20 in this order. In the case of a reflection or transflective type, the array substrate 10 is further provided with a light reflector for reflecting external light. At least in a region for displaying reflected light, the polarizing plate of the color filter substrate 20 should be a circularly polarizing plate provided with a so-called λ/4 retarder.

In the liquid crystal display device according to the first embodiment, the color filter on array mode may be employed, that is, the array substrate 10 may be provided with color filters. The liquid crystal display device according to the first embodiment may be a monochrome display. In this case, no color filter is needed.

The liquid crystal layer 30 is filled with a liquid crystal material that is aligned in specific directions when a certain voltage is applied. The alignment of the liquid crystal molecules in the liquid crystal layer 30 is controlled by applying a voltage not lower than a threshold voltage, and the control mode of the alignment is not particularly limited to the TN mode, VA mode, IPS mode and the like. The control mode may be the MVA mode in which both or one of the substrates have protrusions of a dielectric material and/or slits in electrodes. In this case, a wide viewing angle can be achieved.

Regarding the liquid crystal display device according to the first embodiment, the composition of the alignment films, the monomer components for PSA layer formation (derived from polymerizable monomers) in the PSA layers, the amounts of the contained monomers for PSA layer formation (polymerizable monomers) in the liquid crystal layer, the ratio of the monomers for PSA layer formation in the PSA layers (polymerizable monomers), and the like can be analyzed by disassembling the liquid crystal display device (for example, a liquid crystal TV (television) or a DID (digital information display)), and performing a chemical analysis by nuclear magnetic resonance (NMR) analysis, Fourier transform infrared spectroscopy (FT-TR), mass spectrometry (MS: Mass Spectrometry), or the like.

Example 1

Hereinafter, Example 1 is described in which a liquid crystal cell of the liquid crystal display device according to the first embodiment was actually produced. First, as a vertical alignment film material, a solution containing a polyamic acid or polyimide including a side chain containing a photo-active functional group was applied to the surfaces of a pair of supporting substrates. The substrates were pre-baked at 80° C. and then post-baked at 200° C. for 60 minutes.

Next, a photo-alignment treatment was performed by emitting polarized UV rays with a wavelength of about 300 nm from a direction oblique at 45° to the surfaces of the supporting substrates. The dose of UV rays was 100 mJ/cm².

Next, a seal was applied to one of the supporting substrates and beads were scattered on the other supporting substrate. The supporting substrates were attached to each other, and a composition for a liquid crystal layer which contains a liquid crystal material having negative dielectric anisotropy was injected between the substrates. In the present example, as compositions for a liquid crystal layer, a plurality of samples were prepared by using a composition for a polymer layer which contains a polymerizable monomer $M_T$ (monomer for reducing pretilt image sticking) represented by the following formula (11) and a polymerizable monomer $M_D$ (monomer for reducing DC image sticking) represented by the following formula (12). The weight ratios between the polymerizable monomers $M_T$ and $M_D$ of these samples were different. Specifically, the weight ratios ($M_T$:$M_D$) of the polymerizable monomer $M_T$ to the polymerizable monomer $M_D$ of the samples having different weight ratios prepared in the present example were 9:1 (sample E1), 3:1 (sample C1), 1:1 (sample D1), and 1:3 (sample E1). Further, for preparation of reference cells for comparison with the samples used in the present example, a composition containing only the polymerizable monomer $M_T$ ($M_T$:$M_D$=1:0) (sample A1) and a composition containing only the polymerizable monomer $M_D$ ($M_T$:$M_D$=1:10) (sample F1) were also prepared.

[Chem 11]

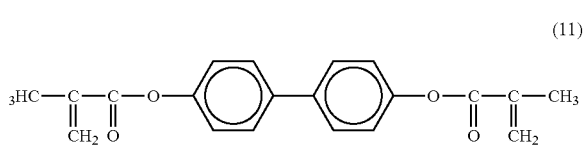

(11)

[Chem 12]

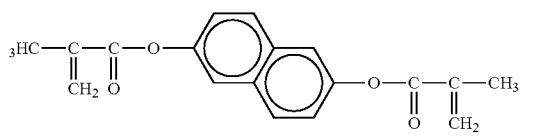

(12)

Next, the supporting substrates with the composition for a liquid crystal layer injected therebetween were heated to 130° C. and quenched. Then, the polymerization reaction was allowed to proceed under irradiation from the blacklight (with UV rays with a peak wavelength of 300 to 350 nm) for 60 minutes without applying a voltage to the liquid crystal layer. In this way, liquid crystal cells having PSA layers on vertical alignment films were prepared.

Subsequently, the voltage holding ratio (VHR), change in the pretilt angle, and residual DC voltage were measured for the respective liquid crystal cells prepared as above.

The VHR was measured twice for the initial voltage holding ratio and after 1000 hours from the start of voltage application. The change in the pretilt angle was calculated by subtracting the pretilt angle before AC voltage application, from the pretilt angle after 100 hours of AC voltage application. The residual DC voltage was measured at 40° C. by Flicker Elimination technology using a DC offset voltage at 1 V. Hereinafter, the results are described.

Table 1 shows the results of the VHF (%) before the voltage application of each sample. The values for $M_T$ and $M_D$ are weight ratios.

TABLE 1

|  | Sample A1 | Sample B1 | Sample C1 | Sample D1 | Sample E1 | Sample F1 |
|---|---|---|---|---|---|---|
| $M_T$ | 1 | 9 | 3 | 1 | 1 | 0 |
| $M_D$ | 0 | 1 | 1 | 1 | 3 | 1 |
| VHR (%) | 99.5 | 99.5 | 99.5 | 99.5 | 99.5 | 99.4 |

From the results in Table 1, all the samples were shown to provide an initial VHR of not lower than 99%, and to produce no bad effect on displays such as flicker. In addition, the VHRs of all the samples were not lower than 99% even after 1000 hours from the start of voltage application. Accordingly, the reliability of all the samples was proved.

Figure 3:
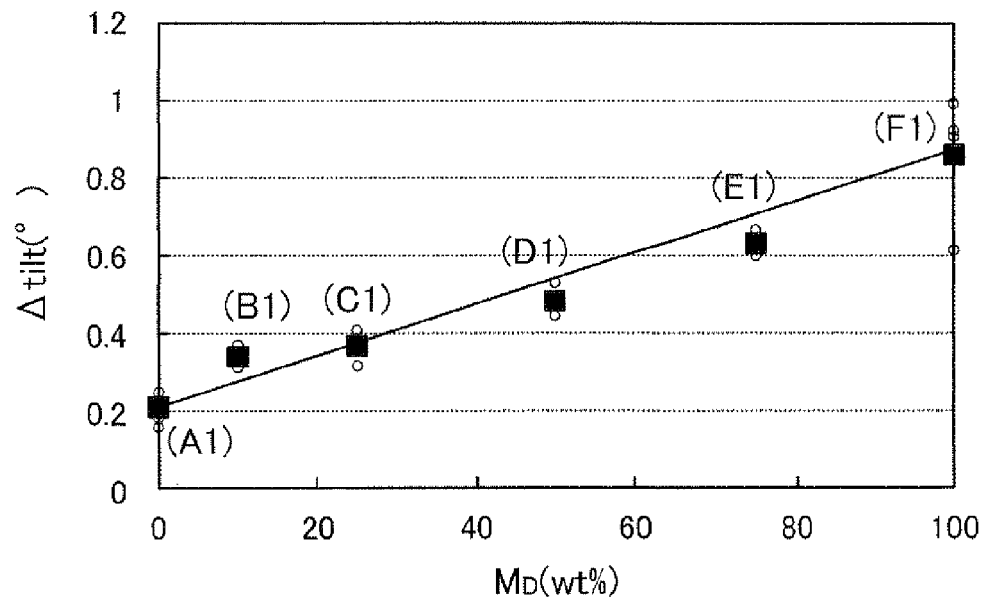
FIG. 3 is a graph showing a change ($\Delta$ tilt (°)) of the pretilt angle plotted against the concentration (wt %) of a polymerizable monomer $M_D$.

FIG. 3 is a graph showing the change ($\Delta$ tilt (°)) in the pretilt angle plotted against the concentration (wt %) of the polymerizable monomer $M_D$. The concentration (wt %) of the polymerizable monomer $M_T$ can be calculated from the concentration (wt %) of the polymerizable monomer $M_D$. As shown in FIG. 2, the change in the pretilt angle (°) increased with increasing concentration of the polymerizable monomer $M_D$.

Figure 4:
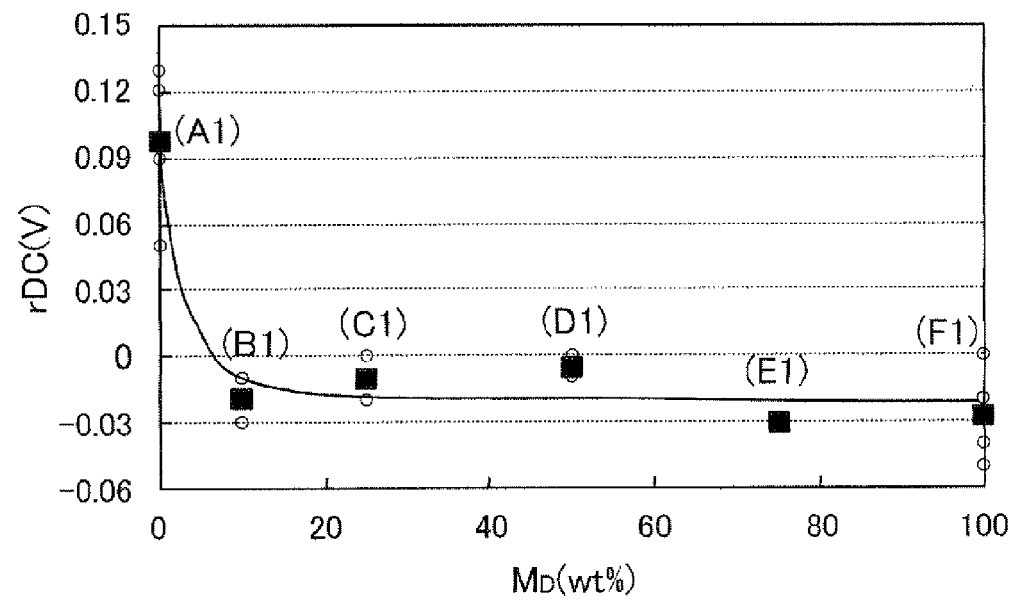
FIG. 4 is a graph showing the magnitude of the residual DC voltage (rDC (V)) plotted against the concentration (wt %) of the polymerizable monomer $M_D$.

FIG. 4 is a graph showing the magnitude of the residual DC voltage (rDC (V)) plotted against the concentration (wt %) of the polymerizable monomer $M_D$. The concentration (wt %) of the polymerizable monomer $M_T$ can be calculated from the concentration (wt %) of the polymerizable monomer $M_D$. As shown in FIG. 4, the residual DC voltage (V) was highest at a polymerizable monomer $M_D$ concentration of 0 wt % and decreased with increasing concentration of the polymerizable monomer $M_D$ in the concentration range of 0 to 10 wt %. However, the residual DC voltage (V) did not largely change in the polymerizable monomer $M_D$ concentration range of not lower than 10 wt %.

From the results shown in FIGS. 3 and 4, the samples B1, C1, D1 and E1 were shown to favorably prevent both of changes in the pretilt angle and residual DC voltages. The sample D1 was good, the sample C1 was better, and the sample B1 was the best.

The results can be summarized as follows: in the case where only the two species of polymerizable monomers are used as the polymerizable monomers, the weight ratio of the polymerizable monomer $M_T$ to the total weight of two species of polymerizable monomers is preferably not lower than 25 wt %, more preferably not lower than 50 wt %, further more preferably not lower than 75 wt %, and particularly preferably not lower than 90 wt %.

From FIG. 4, it was found that the residual DC voltage rapidly changed in the polymerizable monomer $M_D$ concentration range of 0 to 10 wt %, that the polymerizable monomer $M_D$ at a concentration of 5 wt % (i.e. a polymerizable monomer $M_T$ concentration of 95 wt %) produced a certain level of a residual DC voltage reducing effect, which is a similar level to that of the image sticking prevention effect achieved at a polymerizable monomer $M_D$ concentration of 10 wt % (i.e. a polymerizable monomer $M_T$ concentration of 90 wt %). These findings revealed that the polymerizable monomer $M_T$ among the two species of polymerizable monomers produces a good effect at a concentration of not higher than 95 wt %.

Example 2

Hereinafter, Example 2 is described in which a liquid crystal cell of the liquid crystal display device according to the first embodiment was actually produced. In Example 2, samples were prepared in the same manner as in Example 1, except that a different polymerizable monomer $M_T$ (monomer for reducing pretilt image sticking) and a different polymerizable monomer $M_D$ (monomer for reducing DC image sticking) were used. The polymerizable monomer $M_T$ and the polymerizable monomer $M_D$ used in Example 2 were a compound represented by the following formula (13) and a compound represented by the following formula (14), respectively.

[Chem 13]

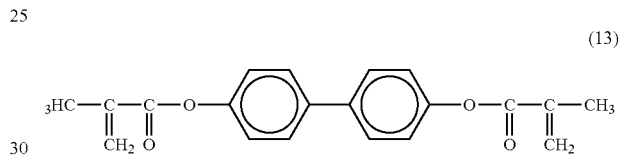

(13)

[Chem 14]

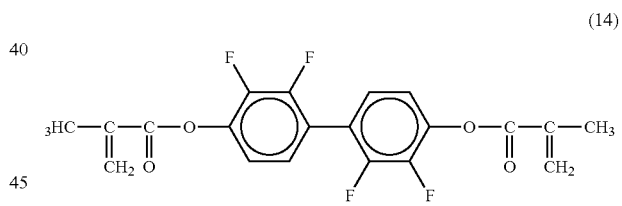

(14)

The weight ratios ($M_T$:$M_D$) of the polymerizable monomer $M_D$ to the polymerizable monomer $M_D$ of the samples prepared in Example 2 were 9:1 (sample B2), 3:1 (sample C2), 1:1 (sample D2), and 1:3 (sample E2). Further, for preparation of reference cells for comparison with the samples used in the present example, a composition containing only the polymerizable monomer $M_T$ ($M_T$:$M_D$=1:10) (sample A2) and a composition containing only the polymerizable monomer $M_n$ ($M_T$:$M_D$=0:10) (sample F2) were also prepared.

Table 2 shows the results of (1) the VHR (%) measured before voltage application, (2) the change ($\Delta$ tilt (°)) in the pretilt angle against the polymerizable monomer $M_n$ concentration (wt %), and (3) the magnitude of the residual DC voltage (rDC (V)) against the polymerizable monomer $M_D$ concentration (wt %) of the respective samples. The values for $M_T$ and $M_D$ are weight ratios.

TABLE 2

|  | Sample A2 | Sample B2 | Sample C2 | Sample D2 | Sample E2 | Sample F2 |
|---|---|---|---|---|---|---|
| $M_T$ | 1 | 9 | 3 | 1 | 1 | 0 |
| $M_D$ | 0 | 1 | 1 | 1 | 3 | 1 |
| VHR (%) | 99.5 | 99.5 | 99.5 | 99.5 | 99.5 | 99.5 |
| $\Delta$ tilt (°) | 0.202 | 0.22 | 0.27 | 0.31 | 0.375 | 0.44 |
| rDC (V) | 0.0975 | 0.015 | 0.015 | 0.025 | 0.020 | 0.020 |

From the results in Table 2, all the samples were shown to provide an initial VHR of not lower than 99%, and to produce no bad effect on displays such as flicker. In addition, the VHRs of all the samples were not lower than 99% even after 1000 hours from the start of voltage application. Accordingly, the reliability of all the samples was proved.

As shown in Table 2, the change in the pretilt angle (°) increased with increasing concentration of the polymerizable monomer $M_D$.

As shown in Table 2, the residual. DC voltage (V) was highest at a polymerizable monomer $M_D$ concentration of 0 wt % and decreased with increasing concentration of the polymerizable monomer $M_D$ in the concentration range of 0 to 10 wt %. However, the residual DC voltage (V) did not largely change in the polymerizable monomer $M_D$ concentration range of not lower than 10 wt %.

From the results shown in Table 2, the samples B2, C2, D2 and E2 were shown to favorably prevent both of changes in the pretilt angle and residual DC voltages. The sample D2 was good, the sample C2 was better, and the sample B2 was the best.

The results can be summarized as follows: in the case where only the two species of polymerizable monomers are used as the polymerizable monomers, the weight ratio of the polymerizable monomer $M_T$ to the total weight of two species of polymerizable monomers is preferably not lower than 25 wt %, more preferably not lower than 50 wt %, further more preferably not lower than 75 wt %, and particularly preferably not lower than 90 wt %.

From Table 2, it was found that the residual DC voltage rapidly changed in the polymerizable monomer $M_D$ concentration range of 0 to 10 wt %, that the polymerizable monomer $M_D$ at a concentration of 5 wt % (i.e. a polymerizable monomer $M_T$ concentration of 95 wt %) produced a certain level of a residual DC voltage reducing effect, which is a similar level to that of the image sticking prevention effect achieved at a polymerizable monomer $M_D$ concentration of 10 wt % (i.e. a polymerizable monomer $M_T$ concentration of 90 wt %). These findings revealed that the polymerizable monomer $M_T$ among the two species of polymerizable monomers produces a good effect at a concentration of not higher than 95 wt %.

and 2, except that a different polymerizable monomer $M_T$ (monomer for reducing pretilt image sticking) and a different polymerizable monomer $M_D$ (monomer for reducing DC image sticking) were used. The polymerizable monomer $M_T$ and the polymerizable monomer $M_D$ used in Example 3 were a compound represented by the following formula (15) and a compound represented by the following formula (16), respectively.

[Chem 15]

(15)

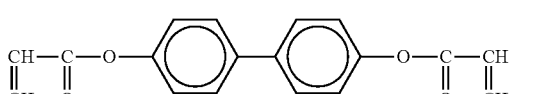

(16)

The weight ratios ($M_T$:$M_D$) of the polymerizable monomer $M_T$ to the polymerizable monomer $M_D$ of the samples prepared in Example 3 were 9:1 (sample B3), 3:1 (sample C3), 1:1 (sample D3), and 1:3 (sample E3). Further, for preparation of reference cells for comparison with the samples used in the present example, a composition containing only the polymerizable monomer $M_T$ ($M_T$:$M_D$=10:0) (sample A3) and a composition containing only the polymerizable monomer $M_D$ ($M_T$:$M_D$=0:10) (sample F3) were also prepared.

Table 3 shows the results of (1) the VHR (%) measured before voltage application, (2) the change ($\Delta$ tilt (°)) in the pretilt angle against the polymerizable monomer $M_D$ concentration (wt %), and (3) the magnitude of the residual DC voltage (rDC (V)) against the polymerizable monomer $M_D$ concentration (wt %) of the respective samples. The values for $M_T$ and $M_D$ are weight ratios.

TABLE 3

|  | Sample A3 | Sample B3 | Sample C3 | Sample D3 | Sample E3 | Sample F3 |
|---|---|---|---|---|---|---|
| $M_T$ | 1 | 9 | 3 | 1 | 1 | 0 |
| $M_D$ | 0 | 1 | 1 | 1 | 3 | 1 |
| VHR (%) | 99.5 | 99.5 | 99.5 | 99.4 | 99.3 | 99.1 |
| $\Delta$ tilt (°) | 0.202 | 0.42 | 0.69 | 0.96 | 1.33 | 1.75 |
| rDC (V) | 0.0975 | 0.010 | 0.005 | −0.005 | −0.005 | 0.00 |

Example 3

Hereinafter, Example 3 is described in which a liquid crystal cell of the liquid crystal display device according to the first embodiment was actually produced. In Example 3, samples were prepared in the same manner as in Examples 1

From the results in Table 3, all the samples were shown to provide an initial VHR of not lower than 99%, and to produce no bad effect on displays such as flicker. In addition, the VHRs of all the samples were not lower than 99% even after 1000 hours from the start of voltage application. Accordingly, the reliability of all the samples was proved.

As shown in Table 3, the change in the pretilt angle (°) increased with increasing concentration of the polymerizable monomer $M_D$.

As shown in Table 3, the residual DC voltage (V) was highest at a polymerizable monomer $M_D$ concentration of 0 wt % and decreased with increasing concentration of the polymerizable monomer $M_D$ in the concentration range of 0 to 10 wt %. However, the residual DC voltage (V) did not largely change in the polymerizable monomer $M_D$ concentration range of not lower than 10 wt %.

From the results shown in Table 3, the samples B3, C3, D3 and E3 were shown to favorably prevent both of changes in the pretilt angle and residual DC voltages. The sample D3 was good, the sample C3 was better, and the sample B3 was the best.

The results can be summarized as follows: in the case where only the two species of polymerizable monomers are used as the polymerizable monomers, the weight ratio of the polymerizable monomer $M_T$ to the total weight of two species of polymerizable monomers is preferably not lower than 25 wt %, more preferably not lower than 50 wt %, further more preferably not lower than 75 wt %, and particularly preferably not lower than 90 wt %.

From Table 3, it was found that the residual DC voltage rapidly changed in the polymerizable monomer $M_D$ concentration range of 0 to 10 wt %, that the polymerizable monomer $M_D$ at a concentration of 5 wt % (i.e. a polymerizable monomer $M_T$ concentration of 95 wt %) provided a certain level of a residual DC voltage reducing effect, which is a similar level to that of the image sticking prevention effect achieved at a polymerizable monomer $M_D$ concentration of 10 wt % (i.e. a polymerizable monomer $M_T$ concentration of 90 wt %). These findings revealed that the polymerizable monomer $M_T$ among the two species of polymerizable monomers produces a good effect at a concentration of not higher than 95 wt %.

The present application claims priority to Patent Application No. 2009-083201 filed in Japan on Mar. 30, 2009 under the Paris Convention and provisions of national law in a designated State, the entire contents of which are hereby incorporated by reference.

EXPLANATION OF NUMERALS AND SYMBOLS

10: Array substrate
11, 21: Supporting substrate
12, 22: Alignment film
13, 23: PSA layer (polymer layer)
20: Color filter substrate
30: Liquid crystal layer
31: Liquid crystal molecule
$M_T$: Polymerizable monomer (monomer for reducing pretilt image sticking)
$M_D$: Polymerizable monomer (monomer for reducing DC image sticking)

The invention claimed is:

1. A liquid crystal display device comprising:
a pair of substrates; and
a liquid crystal layer between the substrates,
wherein at least one of the substrates comprises an alignment film and a polymer layer on the alignment film,
the polymer layer comprises monomer units derived from at least two species of polymerizable monomers,
the at least two species of polymerizable monomers include at least a first polymerizable monomer and a second polymerizable monomer,
the first polymerizable monomer is a polyfunctional monomer represented by the formula (I-1):

$$P^1\text{-}S^1\text{-}A^1\text{-}(Z^1\text{-}A^2)_n\text{-}S^2\text{-}P^2 \quad (I\text{-}1)$$

wherein $P^1$ and $P^2$ each represent a methacrylate group; $A^1$ and $A^2$ each represent a 1,4-phenylene group; $Z^1$ represents a direct bond between $A^1$ and $A^2$, or $A^2$ and $A^2$, n is 0, 1, or 2; $S^1$ and $S^2$, which are the same or different, each represent $(CH_2)_m$ (1≤m≤6), $(CH_2-CH_2-O)_m$ (1≤m≤6) or a direct bond between $P^1$ and $A^1$, $A^1$ and $P^2$, or $A^2$ and $P^2$; and all or part of hydrogen atoms of $A^1$ and $A^2$ may be substituted with halogens and/or methyl groups; and the second polymerizable monomer which is different from the first polymerizable monomer is a polyfunctional monomers represented by the formula (I-2):

$$P^1\text{-}S^1\text{-}A^1\text{-}(Z^1\text{-}A^2)_n\text{-}S^2\text{-}P^2 \quad (I\text{-}2)$$

wherein $P^1$ and $P^2$, which are the same or different, each represent an acrylate group, methacrylate group, acrylamide group, methacrylamide group, vinyl group, vinyloxy group, or epoxy group; $A^1$ and $A^2$ each represent a napthalene-2,6-diyl group, anthracene-2,6-diyl group, phenanthrene-2,6-diyl group or 1,4-phenylene group; —$Z^1$ represents COO, OCO, O, CO, NHCO, CONH, S, or a direct bond between $A^1$ and $A^2$, or $A^2$ and $A^2$, n is 0, 1, or 2; $S^1$ and $S^2$, which are the same or different, each represent $(CH_2)_m$ (1≤m≤6), $(CH_2-CH_2-O)_m$ (1≤m≤6) or a direct bond between $P^1$ and $A^1$, $A^1$ and $P^2$, or $A^2$ and $P^2$; and all or part of hydrogen atoms of $A^1$ and $A^2$ may be substituted with halogens and/or methyl groups.

2. The liquid crystal display device according to claim 1, wherein both of the substrates comprises electrodes, and
the polymer layer is formed by a polymerization reaction while a voltage is applied to the liquid crystal layer through the electrodes.

3. The liquid crystal display device according to claim 1, wherein the alignment film is formed from a material containing a polyimide.

4. The liquid crystal display device according to claim 3, wherein the polyimide includes a side chain containing a photoactive functional group.

5. The liquid crystal display device according to claim 1, wherein the alignment film aligns liquid crystal molecules in the liquid crystal layer in a direction vertical to a surface of the alignment film while no voltage is applied to the liquid crystal layer.

6. The liquid crystal display device according to claim 1, wherein the alignment film aligns liquid crystal molecules in the liquid crystal layer in predetermined directions and a direction horizontal to a surface of the alignment film while no voltage is applied to the liquid crystal layer.

7. A composition for a polymer layer, comprising at least two species of polymerizable monomers,
wherein the at least two species of polymerizable monomers include at least a first polymerizable monomer and a second polymerizable monomer,
the first polymerizable monomer is polyfunctional monomer represented by the formula (I-1):

$$P^1\text{-}S^1\text{-}A^1\text{-}(Z^1\text{-}A^2)_n\text{-}S^2\text{-}P^2 \quad (I\text{-}1)$$

wherein $P^1$ and $P^2$ each represent a methacrylate group; $A^1$ and $A^2$ each represent a 1,4-phenylene group; $Z^1$ represents a direct bond between $A^1$ and $A^2$, or $A^2$ and $A^2$, n is 0, 1, or 2; $S^1$ and $S^2$, which are the same or different, each represent $(CH_3)_m$ (1≤m≤6), $(CH_2-CH_2-O)_m$ (1≤m≤6) or a direct bond between $P^1$ and $A^1$, $A^1$ and $P^2$, or $A^2$ and $P^2$; and all or part of hydrogen atoms of $A^1$ and $A^2$ may be substituted with halogens and/or methyl groups; and the second polymerizable monomer which is different from the first polymerizable monomer is polyfunctional monomer represented by the formula (I-2):

$$P^1\text{-}S^1\text{-}A^1\text{-}(Z^1\text{-}A^2)_n\text{-}S^2P^2 \qquad (I\text{-}2)$$

wherein $P^1$ and $P^2$, which are the same or different, each represent an acrylate group, methacrylate group, acrylamide group, methacrylamide group, vinyl group, vinyloxy group, or epoxy group: $A^1$ and $A^2$ each represent a naphthalen-2,6-diyl group, anthracene-2,6-diyl group, phenanthrene-2,6-diyl group or 1,4-phenylene group; $Z^1$ represents COO, OCO, O, CO, NHCO, CONH, S, or a direct bond between $A^1$ and $A^2$, or $A^2$ and $A^2$, n is 0, 1, or 2; $S^1$ and $S^2$, which are the same or different, each represent $((CH_2)_m$ ($1 \leq m \leq 6$), $(CH_2\text{---}CH_2\text{---}O)_m$ ($1 \leq m \leq 6$) or a direct bond between $P^1$ and $A^1$, $A^1$ and $P^2$, or $A^2$ and $P^2$; and all or part of hydrogen atoms of $A^1$ and $A^2$ may be substituted with halogens and/or methyl groups.

8. The liquid crystal display device according to claim 1, wherein, in the formula (I-2), each of $P^1$ and $P^2$ represent an acrylate group, and each of $A^1$ and $A^2$ represent a 1,4-phenylene group.

9. The liquid crystal display device according to claim 8, wherein the second polymerizable monomer is represented by the chemical formula (16):

[Chem. 1]

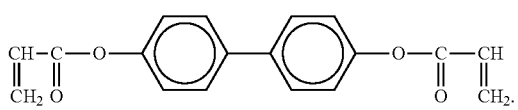

(16)

10. The liquid crystal display device according to claim 1, wherein, in the formula (I-2), each of $P^1$ and $P^2$ represent a methacrylate group, and $A^1$ represents a naphthalene-2,6-diyl group.

11. The liquid crystal display device according to claim 10, wherein the second polymerizable monomer is represented by the chemical formula (12):

[Chem. 2]

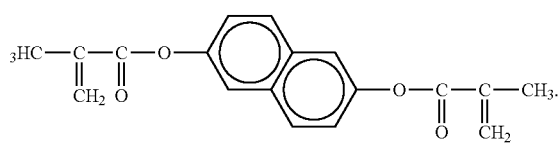

(12)

12. The liquid crystal display device according to claim 1, wherein, in the formula (I-2), each of $P^1$ and $P^2$ represent a methacrylate group, each of $A^1$ and $A^2$ represent a 1,4-phenylene group, and all or part of hydrogen atoms of $A^1$ and $A^2$ are substituted with halogens and/or methyl groups.

13. The liquid crystal display device according to claim 12, wherein the second polymerizable monomer is represented by the chemical formula (14):

[Chem. 3]

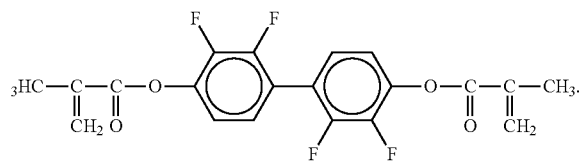

(14)

14. The liquid crystal display device according to claim 1, wherein, in the formula (I-1), each of $P^1$ and $P^2$ represent a methacrylate group, and each of $A^1$ and $A^2$ represent a 1,4-phenylene group.

15. The liquid crystal display device according to claim 14, wherein the first polymerizable monomer is represented by the chemical formula (11):

[Chem. 4]

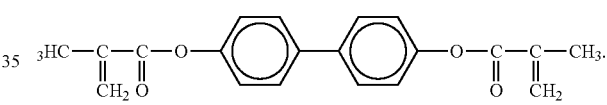

(11)

16. The liquid crystal display device according to claim 1, wherein, in the at least two species of polymerizable monomers, a weight ratio of the first polymerizable monomer is larger than 50% and 90% or less.

17. The composition for a polymer layer according to claim 7, wherein, in the formula (I-2), each of $P^1$ and $P^2$ represent an acrylate group, and each of $A^1$ and $A^2$ represent a 1,4-phenylene group.

18. The composition for a polymer layer according to claim 17, wherein the second polymerizable monomer is represented by the chemical formula (16):

[Chem. 5]

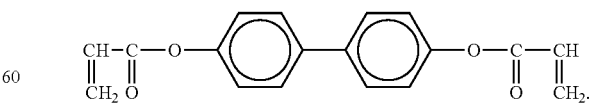

(16)

19. The composition for a polymer layer according to claim 7, wherein, in the formula (I-2), each of $P^1$ and $P^2$ represent a methacrylate group, and $A^1$ represents a naphthalene-2,6-diyl group.

20. The composition for a polymer layer according to claim 19, wherein the second polymerizable monomer is represented by the chemical formula (12):

[Chem. 6]

(12)

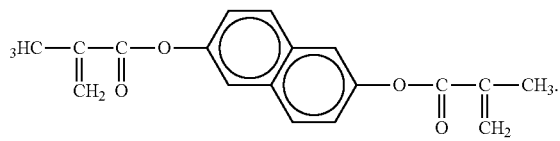

21. The composition for a polymer layer according to claim 7, wherein, in the formula (I-2), each of $P^1$ and $P^2$ represent a methacrylate group, each of $A^1$ and $A^2$ represent a 1,4-phenylene group, and all or part of hydrogen atoms of $A^1$ and $A^2$ are substituted with halogens and/or methyl groups.

22. The composition for a polymer layer according to claim 21, wherein the second polymerizable monomer is represented by the chemical formula (14):

[Chem. 7]

(14)

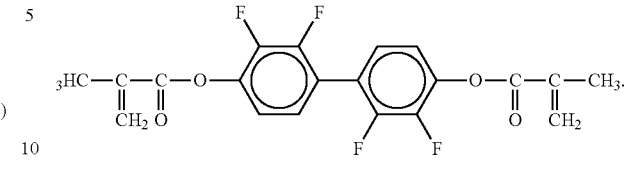

23. The composition for a polymer layer according to claim 7, wherein, in the formula (I-1), each of $P^1$ and $P^2$ represent a methacrylate group, and each of $A^1$ and $A^2$ represent a 1,4-phenylene group.

24. The composition for a polymer layer according to claim 23, wherein the first polymerizable monomer is represented by the chemical formula (11):

[Chem. 8]

(11)

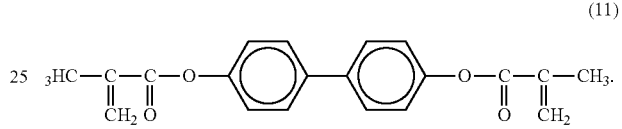

* * * * *

UNITED STATES PATENT AND TRADEMARK OFFICE
CERTIFICATE OF CORRECTION

| | |
|---|---|
| PATENT NO. | : 8,647,724 B2 |
| APPLICATION NO. | : 13/257797 |
| DATED | : February 11, 2014 |
| INVENTOR(S) | : Mizusaki et al. |

It is certified that error appears in the above-identified patent and that said Letters Patent is hereby corrected as shown below:

In the Claims:

Column 28, line 66 (claim 7, line 13):

"$(CH_3)_m$" should read --$(CH_2)_m$--

Signed and Sealed this
Twentieth Day of May, 2014

Michelle K. Lee
*Deputy Director of the United States Patent and Trademark Office*